US012439222B2

(12) United States Patent
Feeney (10) Patent No.: US 12,439,222 B2
(45) Date of Patent: Oct. 7, 2025

(54) SYSTEMS AND METHODS FOR PROCESSING DATA BASED ON ACQUIRED PROPERTIES OF A TARGET (71) Applicant: 3D STAGE TRACKER LIMITED, Dublin (IE)

(72) Inventor: Liam Feeney, Sligo (IE)

(73) Assignee: 3D STAGE TRACKER LIMITED, Dublin (IE)

( * ) Notice: Subject to any disclaimer, the term of this patent is extended or adjusted under 35 U.S.C. 154(b) by 344 days.

(21) Appl. No.: 17/286,432

(22) PCT Filed: Oct. 17, 2019

(86) PCT No.: PCT/EP2019/078305
§ 371 (c)(1),
(2) Date: Apr. 16, 2021

(87) PCT Pub. No.: WO2020/079201
PCT Pub. Date: Apr. 23, 2020

(65) Prior Publication Data
US 2021/0392462 A1 Dec. 16, 2021

(30) Foreign Application Priority Data
Oct. 18, 2018 (GB) ..................... 1817018

(51) Int. Cl.
*H04W 4/029* (2018.01)
*F21V 14/04* (2006.01)
(Continued)

(52) U.S. Cl.
CPC ............. *H04W 4/029* (2018.02); *F21V 14/04* (2013.01); *F21V 21/088* (2013.01);
(Continued)

(58) Field of Classification Search
CPC ....... H04W 4/80; H04W 4/029; H04W 4/023; H04W 4/02; H04W 4/021; H04W 4/38;
(Continued)

(56) References Cited

U.S. PATENT DOCUMENTS 5,749,646 A * 5/1998 Brittell ...................... F21K 9/23
362/240
2002/0149940 A1* 10/2002 Fruhm ................. H05B 47/105
362/418
(Continued)

FOREIGN PATENT DOCUMENTS

WO    WO-2016198556 A1 * 12/2016   ............. G02B 26/08

OTHER PUBLICATIONS

PCT/EP2019/078305 International Search Report & Written Opinion (Feb. 7, 2020).

*Primary Examiner* — Alison Slater
*Assistant Examiner* — Jing Gao
(74) *Attorney, Agent, or Firm* — Anthony Smyth; LOZA & LOZA, LLP (57) ABSTRACT

A computer implemented system and method is described. The computer implemented system and method is operable to control changes in output of a media source and/or other sources where the sources and medias inputs and outputs can be changed based on the acquisition of physical properties of a target. Targets can be acquired either passively, actively, with line of sight, remotely or by various means in turn outputs of various sources including but not limited to lighting, audio, video, projection, laser, media, machines mechanical, electronic or other can be caused to change based on positional acquisition. A system is disclosed that includes multi-faceted uses of technologies to overcome the present systems drawbacks. The system contains tools to align any source with any geographical area in 2D and 3D (Continued)

and to implement multiple types of technologies to overcome the drawbacks of current targeting.

27 Claims, 7 Drawing Sheets (51) Int. Cl.
*F21V 21/088* (2006.01)
*H04W 4/021* (2018.01)
*H05B 47/125* (2020.01)
*F21W 131/406* (2006.01)
*G06V 40/16* (2022.01)
*H04N 7/18* (2006.01)

(52) U.S. Cl.
CPC .......... *H04W 4/021* (2013.01); *H05B 47/125* (2020.01); *F21W 2131/406* (2013.01); *G06V 40/161* (2022.01); *H04N 7/183* (2013.01)

(58) Field of Classification Search
CPC ...... H04W 88/02; H04W 4/33; H05B 47/125; F21V 21/30; F21V 29/507; F21V 23/005; F21V 21/06; F21V 21/35; F21V 14/02; F21V 19/001; F21V 15/01; F21V 17/00; F21V 19/00; F21V 21/08; F21V 19/0025; F21V 13/04; F21V 14/04; F21V 21/088; F21V 5/00; F21V 7/00; F21W 2131/406; G06V 40/16; G06V 40/19; G06V 10/245; G06V 40/172; G06V 40/18; G06V 40/171; G06V 40/20; G06V 20/52; G06V 40/174; G06V 40/165; G06V 40/23; G06V 40/166; G06V 40/161; G06V 40/28; G06V 2201/12; H04N 21/4223; H04N 21/2143; H04N 5/2224

See application file for complete search history.

(56) References Cited

U.S. PATENT DOCUMENTS

| | | | |
|---|---|---|---|
| 2004/0093466 A1* | 5/2004 | Hull | H04L 67/52 |
| | | | 711/133 |
| 2005/0072935 A1* | 4/2005 | Lussier | G01N 21/6486 |
| | | | 250/458.1 |
| 2010/0026624 A1 | 2/2010 | Bell | |
| 2013/0070093 A1* | 3/2013 | Rivera | H04N 21/41265 |
| | | | 348/143 |
| 2016/0086015 A1 | 3/2016 | Irmatov et al. | |
| 2018/0160507 A1 | 6/2018 | Feeney | |
| 2018/0292809 A1* | 10/2018 | Farnik | G05B 19/416 |
| 2018/0347805 A1* | 12/2018 | Abou-Fadel | H04N 23/675 |

* cited by examiner

SYSTEMS AND METHODS FOR PROCESSING DATA BASED ON ACQUIRED PROPERTIES OF A TARGET

CLAIM OF PRIORITY

This application is the U.S. National Stage of International Patent Application No. PCT/EP2019/078305 filed Oct. 17, 2019, which claims priority to United Kingdom Patent Application No. GB 1817018.3 filed Oct. 18, 2018.

FIELD

The disclosure relates to a system and method for location acquisition of a body in 3D space, for example a moving object in a geographical location such as a building or on a stage.

BACKGROUND

Currently there exist various methods to acquire an objects location in 3D space. Based on the acquisition of the physical properties of an object information around various systems including but not limited to media, audio, video, projection, lighting, mechanical, electrical can be changed to enhance a performance, give a required input or output and thereby allow for integration across all media live, recorded or otherwise.

Acquiring this location and physical attributes can be done by an operator visually acquiring a target and then moving a light, audio, video, projection or other media controls to make a change. The position can also be acquired by Infrared (IR) signal to an IR camera. Position data can also be acquired by transmitting a wireless signal to receivers and then with triangulation finding the position of the target. None work successfully on their own so several types of acquisition can be used to locate and also geo-fence the target for more accurate positional and movement information.

Problems exist with both IR and wireless as IR will only work internally usually and is susceptible to loss of signal when the IR bulb gets broken, lost or covered. Wireless is susceptible to temperature fluctuations, signal ingress from other sources, intermodulation from other sources and it leads to inaccuracies especially as wireless bands become crowded.

Visually acquiring a target is easier, but where mechanical/electrical lights or other sources are misaligned during installation, where surfaces are not flat for a performances area, the inaccuracies prevent the successful alignment to a single point for operation of multiple fixtures. Further these instruments cannot perform in a 3D space where their calibration is based only on alignment mechanically on a flat surface. The short comings of this visual acquisition of targets in an ideal setting is compounded by the various technologies all working together such as lighting, video, audio, laser, electronic, wireless and mechanical that prevent reliable target acquisition through video based on IR, visible light and other video systems based on heat.

Further to this when operating in large geographic areas, current light sources for a moving light are limited to a distance from the stage, performance area or geographic area of up to approximately 150 feet. There exists no automated light source that can operate as controllable tracking spots to illuminate a performer at distances of up to 200 feet, 300 feet, 400 feet or over manually or with an electronic, mechanical or other control system to align itself with other sources. The current reflector based systems suffer from elongation of the beam due to off-axis alignment with a light source.

It is therefore an object to provide an improved system and method for tracking a target or a moving object.

SUMMARY

According to the invention there is provided, as set out in the appended claims, adaptive methodologies and systems for the implementation of output changes to media and other sources where the sources and medias inputs and outputs can be changed based on the acquisition of physical properties of a target or an object. Where targets can be acquired either passively, actively, with line of sight, remotely or by various means in turn outputs of various sources including but not limited to lighting, audio, video, projection, laser, media, machines mechanical, electronic or other can be caused to change based on positional acquisition.

In one embodiment there is provided a computer implemented method and system for the control of output changes to a source and/or other sources where the sources inputs and outputs can be changed based on the acquisition of at least one physical property of a target.

In one embodiment the source is a light source.

In one embodiment the source is a camera or screen or drone.

In one embodiment the physical property of a target comprises a calculated geographical location of the target. Ideally the target is a performer or person moving on a stage or other suitable environment.

In one embodiment the source can move in a three-dimensional plane in response to the calculated physical property of the target.

In one embodiment the acquisition of a physical property comprises the step of geo-fencing through target worn tags on the target or other methodologies allows for auto image acquisition of targets.

In one embodiment wherein the system and method comprise a plurality of light sources adapted to track a target and adapted to change the intensity of individual lights when light from two or more sources intersect. The method and system is adapted to calibrate the overall intensity of lighting on a target as captured by a camera source.

In one embodiment there is provided a reflective element mounted on a coaxially aligned pan and tilt mechanism and adapted to cooperate with at least one light source.

In one embodiment the system and method can control the position of the reflective element to direct light from a light source to a desired location.

In one embodiment the desired location is determined by the calculated from the physical property of the target.

The present application describes a system that includes multi-faceted uses of technologies to overcome the present systems drawbacks. The system contains tools to align any source with any geographical area in 2D and 3D and to implement multiple types of technologies to overcome the drawbacks of current targeting.

The system can use a line of sight method, camera feed methods, GPS localisation, performer and target worn tags working over wired and or wireless signals with UDP, standard ethernet or other topologies as available to generate a location for a target. Further to these, various methodologies exist to acquire a target automatically with video and to track that target automatically.

In one embodiment the system can use a camera to identify points in space, provide positional data for those points in space and therefore pass that data to instruments to aid their calibration or for ease of programming. An example is where lighting designers must manually position and focus moving lights for each show. Using positional data from a visualiser, drawing or CAD program, lights can have their positional data manipulated to provide an offset calibration to overcome differences in mechanical set-up from one venue or event to another.

The system therefore can use several technologies to accurately and without interruption locate targets and track their position, this a common mode target acquisition to geo-fence the target and therefore overcome shortcoming of other systems. In one embodiment the acquisition of a physical property comprises the step of geo-fencing through target worn tags on the target or other methodologies allows for auto image acquisition of targets. This in turn with other methodologies described herein create a complete target localisation and tracking system.

In one embodiment the system comprises an on-axis gimballed reflective surface which can overcome the mounting limitations of having large lighting sources moving in trusses, towers or other areas. The system also has applications for but not limited to projection, plasma sources and lasers.

In one embodiment the at least one source comprises a camera, said camera is configured to identify points in space and provide positional data for those points in space and therefore pass that data to instruments to aid their calibration or for ease of programming.

In one embodiment positional data from a visualiser, drawing or cad program, lights can have positional data manipulated to provide an offset calibration to overcome differences in mechanical set-up for different locations.

In one embodiment the acquisition of at least one physical property of a target is acquired using a geo-fencing technique.

In one embodiment the target is a stage performer and at least one source is configured with Z offset height to do focus pallets for performers of different heights.

In one embodiment there is provided a screen wherein a camera source is configured to feed an image of the area to the screen such that a software application enables an onscreen cursor denotes where a light source is to illuminate.

In one embodiment the screen comprises an on-screen notation identifying a plurality of sources and their properties.

In one embodiment the system is adapted to send a trigger or information based on the position of the target when the target is moving.

In one embodiment the source comprises a camera source having a weighted camera mount for true horizontal and vertical alignment.

In one embodiment there is provided a visible light source and non-visible light sources to aid calibration in sunlight or for "In the blind" calibration.

In one embodiment a shadow analysis module is configured for accurate tracking of follow spots in real time for one or more light sources.

In one embodiment there is provided a pre-calibration module for a "roughed in" movement of at least one light source prior to doing a more accurate calibration calculation.

In one embodiment the target is a person and the system is configured with a facial recognition module for tracking movement of the person based on the facial features of the person.

In one embodiment the system is configured to track using facial recognition information and control the movement of at least one of a camera source, light source or projection element.

In one embodiment the light source comprises a clamp configured to allow free movement of the light source. Suitably the clamp comprises a mechanically or magnetically actuated lock.

In one embodiment the system comprises an automatic prediction module adapted to predict the position of a source output co-ordinates on a screen associated with the system.

In one embodiment the source comprises a vehicle and a mouse device configured to control movement of the vehicle In one embodiment the system is configured to inhibit movement of the vehicle outside non safe areas or areas outside a performance space.

In another embodiment there is provided a method for the control of output changes to at least one media source and/or other source comprising the step of changing the source and/or media source inputs and outputs based on the acquisition of at least one physical property of a target.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
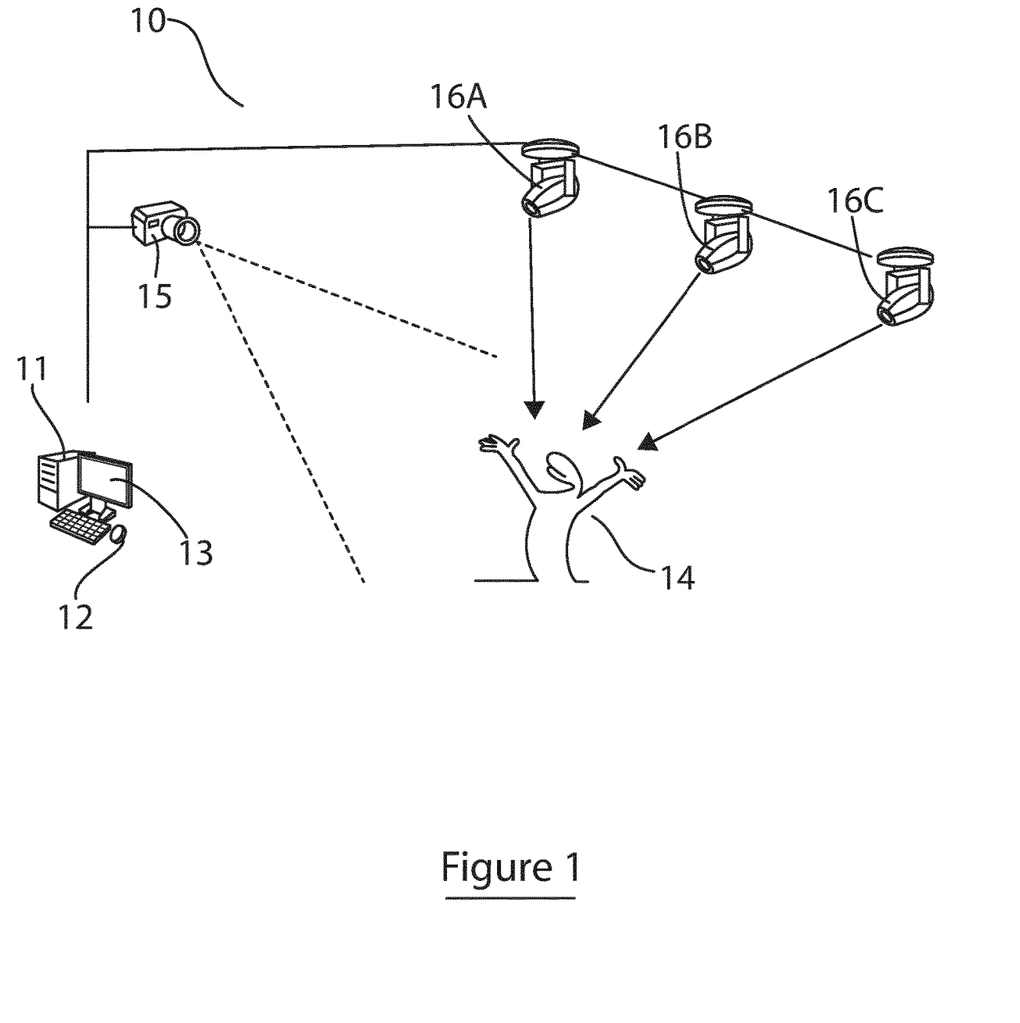
FIG. 1 illustrates a hardware implementation according to one embodiment of the invention.

FIG. 1 illustrates a hardware implementation according to one embodiment of the invention indicated generally by the reference numeral 10. A computer apparatus 11, with associated software. The computer apparatus 11 can comprise a mouse 12 and a user screen 13. The user screen 13 can display a screen cursor denoting a target and the user screen can display a location in a particular geographical area. In the particular geographical location a moving target 14 such as a stage performer can be tracked using appropriate wireless tag or other sensor technology, such as an Infrared sensor and the like. At least one camera 15 and a number of light emitting sources 16A, 16B and 16C, for example a spotlight or light emitting screen or a speaker, which are stationary and can be configured to move in any direction or axis. The light emitting sources 16A, 16B and 16C can move up/down/left/right and operate anywhere in a 3D space. It will be appreciated that the system 10 can include several inputs and output interfaces that can communicate with audio, video, laser, projection, mechanical systems, electronic systems, mechanical performer and object flying systems, drone flying systems, other performer systems to include but not limited to trap doors, pyrotechnics, dropped items and other systems as may depend on performer positioning.

The system 10 can make use of video inputs from at least one camera 15 to visually track an occupant, performer, target 14 and/or using video to verify a target is in an area. This verification can be used to implement remote operation of lighting 16A, video 16B, electronic, mechanical, or other systems in fields as diverse as entertainment, cruise ships, buildings (to save energy, increase safety), large theme parks for remotely operated performance, security and applications where a target can be located and any input triggered manually or automatically and an output triggered manually or automatically. The system 10 makes use of a video camera suitable for low light and night/dark area application.

The system 10 is configured to communicate with one or several targets locations through various methods including but not limited to video, line of sight, GPS, tags, IR and/or wireless radio. The software will communicate its outputs to various systems such as lighting, audio, video, projection, laser, mechanics, flying and rigging, power, mechanical systems, and the like. In an example embodiment the system can be made of a number or all of the components in the following product table:

| Product Features |
| --- |
| PC Hardware |
| 19" Rackable PC with SSD<br>ArtNet to DMX Interface<br>Keyboard, Monitor, Mouse<br>PCIe Video Grabber Card |
| Video Hardware - example only |
| HD Camera - option of IR available<br>Video Distribution Amplifier for users as required<br>Video Line signal boosters as required |
| Software features |
| Camera Status monitoring*<br>Camera Alignment Movement Detection tool<br>Low/Medium/High Light Level Selection<br>Health Check - Frame Rate<br>Health Check - ArtNet<br>ArtNet Configuration<br>On screen magnifier |
| Creative Features |
| Macro Control<br>Area Envelopes<br>Director Messages on screen** |
| On Screen Stage Labels<br>Stage Blocking<br>Remote control<br>Customizable pointers |
| Miscellaneous Features |
| Shutdown Inhibitor<br>Universe Snapshot<br>Cursor Position Coordinates<br>Calibration<br>Standalone Deskless Operation<br>Moving Light Profile Set-up<br>Deskless Operation Toggle<br>Backup of System Parameters |

| Product Features |
| --- |
| Tracking Features |
| Tracking for up to 20 lights<br>Tracking Pan and Tilt<br>Tracking Dimmer (where supported by moving light)<br>Tracking Iris (where supported by moving light)<br>Tracking Zoom (where supported by moving light)<br>Tracking Focus (where supported by moving light)<br>Height Correction of Pan/Tilt on the mouse wheel |

The system 10 can be configured for alignment of video, audio, projection, tags, GPS, line of sight and other inputs can be calibrated to real world positions using existing methods for camera to target alignment. Where the target area is a flat surface these methods are well known. Where the target area is flat and/or of various shapes heights or involving a 3D space to perform in, there currently exists only measurement-based systems based on simulator, rendering and visualiser software packages, for locating targets. Where wireless targeting is used, the system must rely on IR or calibrations to check the accuracy. These systems are subject to mechanical errors and poor accuracy where theoretical outputs don't match actual. In order to overcome these limitations, the system 10 uses a multipoint calibration method to overcome these inaccuracies. This is done when the target to follow for, lighting, audio, video, or other output is captured as they move in the performance or other space by the software through automatic or manual input. The method matches the position of the on-screen mouse cursor, cross hairs or other visual indicator of position to the spot of light from a moving light, the output from a projector, laser, audio device, mechanical object or other device and/or can be done by taking captured data from tags, or other electronic wireless, wired signals and matching them to real world positions on the users screen from a video camera, a map stored by the system, a drones video output, a buildings drawing, 3D rendering or other means of communicating geographical location.

For example, the system 10 is configured to change the mouse cursor position to account for a targets height in the Z axes. The system can also receive Z axes information from multiple sources over known protocols to change the Z axes height of a target and therefore make the typical moving spot clover leaf type shape where multiple lights are following a target. The information can be manually entered into the system 10 to allow an operator to choose Z heights as the target moves around a geographical area, stage or other.

The system 10 allows the user to draw, illustrate, note or otherwise provide a visual indication in the screen 11 of where a point, areas, or other trigger is located. These triggers can automatically, manually or based on input or output change the input or output instruments or their characteristics.

The screen 13 that the user sees the system 10 is configured to attach labels to cursors with an artist's name, cues, messages as required to provide on-screen labelling for the user. These messages can be programmed into a control surface for any media and transmitted over known protocols where upon receipt the on-screen labelling can be triggered. Software can be executed for auto tracking of a target from a video feed method to follow a target autonomously.

The system 10 can be adapted to learn the performance, work, or other type of area that a light illuminates. Using the calibration of what is illuminated, the system can track a performer with generic lights by executing a software program. A camera feeding an image of the area to a screen such that the software enables an onscreen cursor denotes where the lights are to illuminate.

The screen 13 can be provided with on screen tools such as magnifiers to show the user an enlarged image of the area of interest. This can be done during calibration but also during use. It can be triggered manually, automatically or based on inputs and outputs.

The system 10 can learn targets using a machine learning module where a floor meets walls and ceilings. The system 10 can learn locations for positioning on walls, changes in floors due to steps, risers, bumps, hills, ramps, different levels, and positioning where walls meet, positioning on ceilings.

The system 10 can be configured to trigger various inputs and outputs based on a targets location. In other words when following a target the location can automatically trigger other inputs and outputs. This can include but not limited to auto-switching of a video feed from one area to another, a video feed from day to night time camera, from tracking with a light to tracking with video of other outputs.

The system 10 is configured to provide calibration done through any type of video camera, including a smart phone or the like, and can allow another camera to retain the calibration but focus on a different area of the first cameras field of view. This enables camera in camera and multi-camera calibrations. The system 10 can automatically calibrate the output from the sources to a geographical, on screen or another localising instrument. By giving the system control of inputs and indicating their function it can manipulate outputs to calibrate them to a geographical, on screen or other physical location. Geofencing of a target maintains target positioning acquisition. Where targeting systems are currently not accurate, loose calibration, require repeated or daily calibration, geo-fencing maintains a targets position for other targeting acquisition systems to work inside a narrow area and to work in collaboration with other sources, such as the camera 15.

Figure 2:
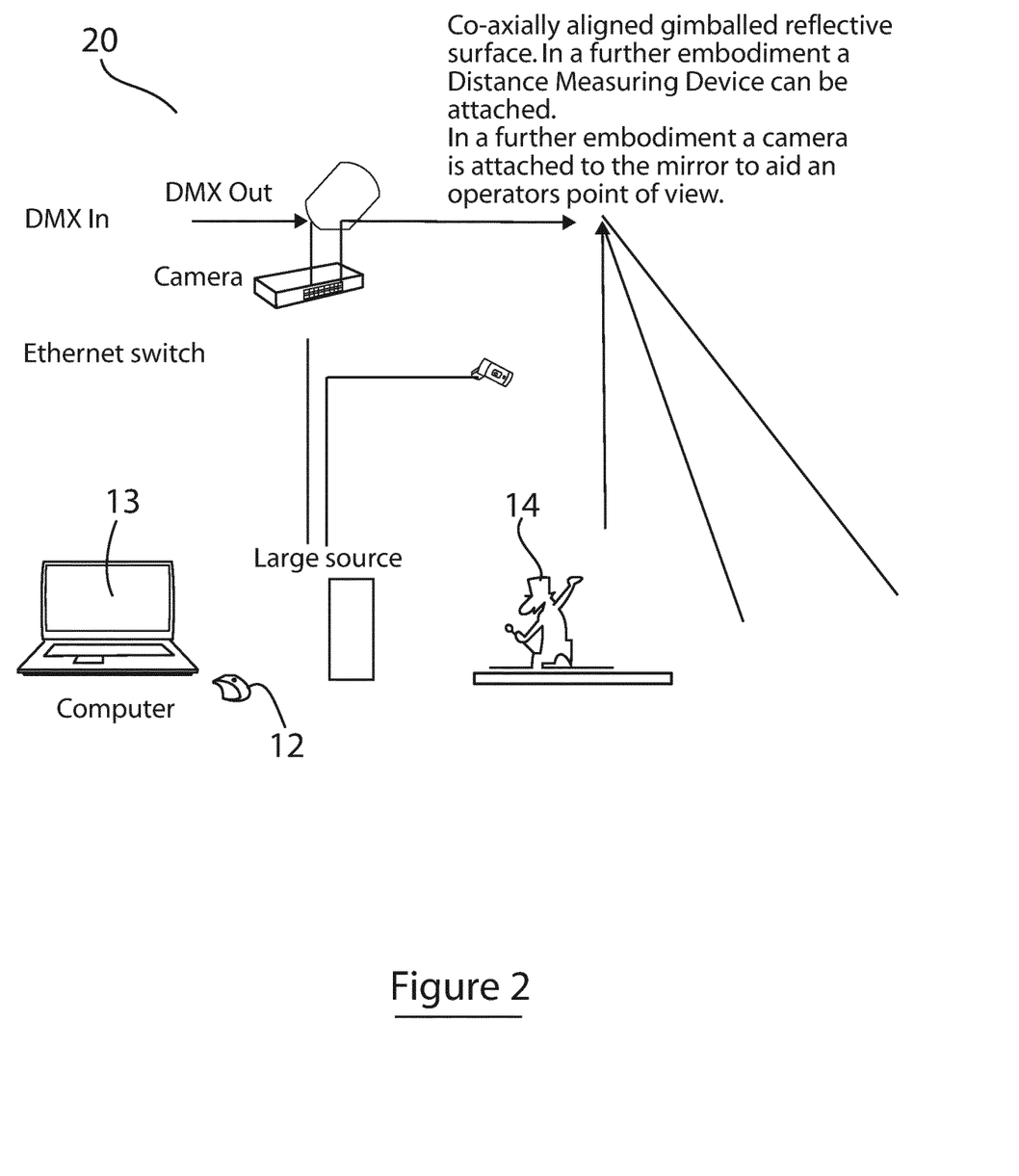
FIG. 2 illustrates a hardware implementation according to another embodiment of the invention, incorporating a reflective element.

FIG. 2 illustrates a hardware implementation according to another embodiment of the invention indicated generally by the reference numeral 20, incorporating a reflective element. The reflective surface can be mounted on a coaxially aligned pan and tilt mechanism, including a laser instrument and or a camera for calibration, alignment and tracking purposes. The embodiment incorporates a reflective surface that can be co-axially mounted to existing or new lighting sources that can operate at distances greater than current moving light sources and over. The instruments movement is controlled by the system, reading back temperature, positional data, corrections, deviations, lux levels, min and max acceleration settings which are used to dampen or enhance the responsiveness of the system. As shown in FIG. 2 the reflective surface can be controlled from the computer by receiving visual input of a moving performer on a stage. The reflective element can be adjusted to track the movement of the user in real time. The reflective element is especially useful for large and/or stationary light sources.

Figure 3:
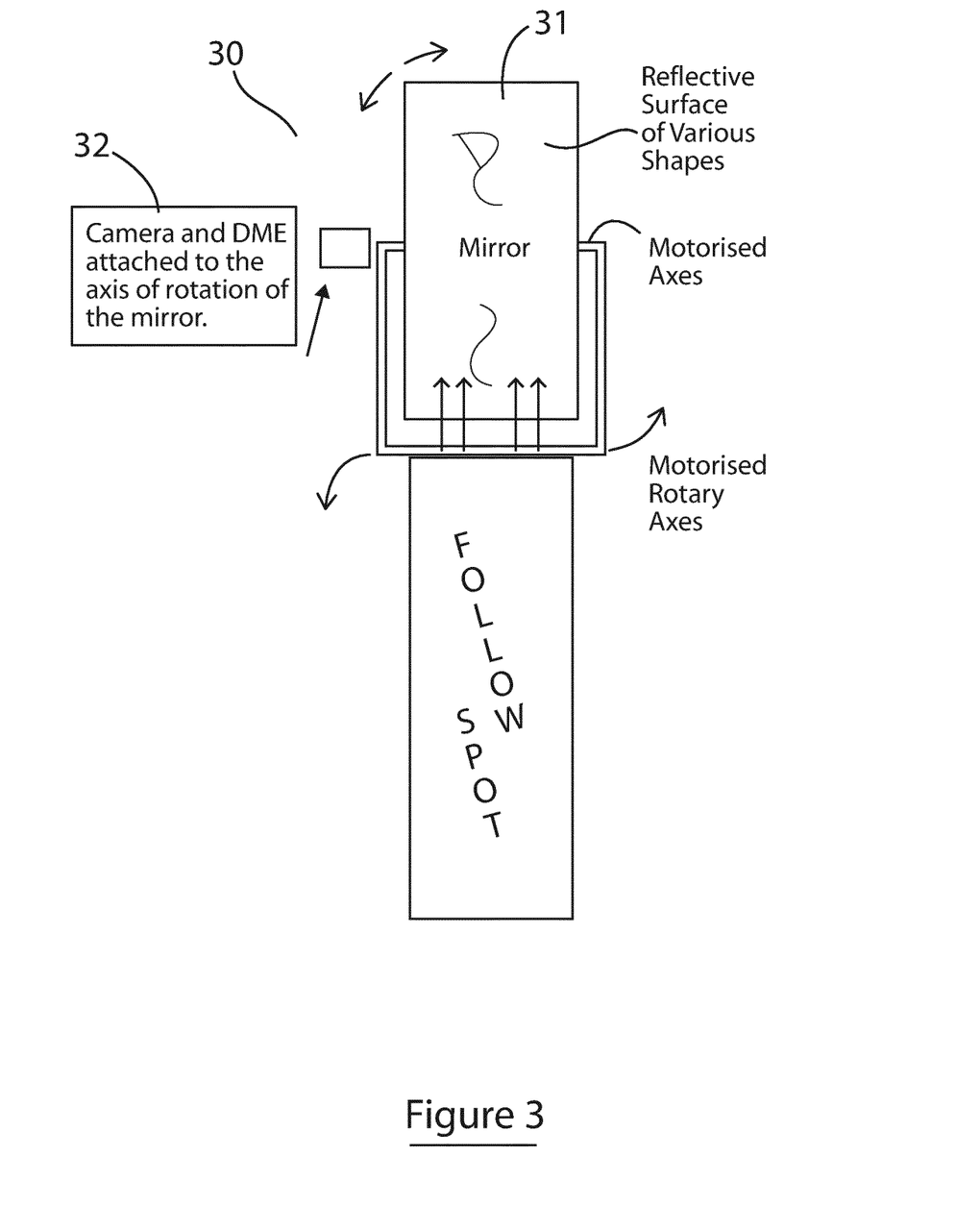
FIG. 3 illustrates the reflective shown in FIG. 2 in combination with a light source.

FIG. 3 illustrates the reflective element shown in FIG. 2 in combination with a light source in more detail indicated by the reference numeral 30. The reflective surface 31, for example a mirror, is gimbal controlled with feedback from accelerometers placed on board for greater accuracy. The reflective device 31 can be cooled by a closed loop or open loop cooling system passively or actively or other combination as the environment requires. The reflective surface can move its mounting either mechanically or with controllable actuators of mechanical, electric, pneumatic or other design to facilitate the usage of several sources.

A camera 32 can be added to the pan and tilt mechanism to assist with calibration, viewing for an operator and or tracking. A laser can be added to the reflective instrument to assist with measurement, targeting, alignment and as needed identification. Where daylight prevent the ability to see a visible light source to the camera, other sources along the visible or invisible light spectrum such as uv, IR can be used in conjunction with a camera specifically designed to pick up that light source frequency.

It will be appreciated that the system 10 can manipulate any source of light, audio, projection or other instrument 15, 16A, 16B, 16C and can direct its focus to a required target 14. Multi-point calibrations can be calculated by the system such that an adaptive intelligent calibration is used to align a 3D space to a 2D environment.

Contour calibrations can also be calculated where points of equal height are followed. Shape and Feature calibrations—where particular shapes are calibrated into the system such as performer runways, risers, on-stage features such as artistic pieces can also be employed.

In another embodiment the system can make use of a weighted camera mount like a plumb level which causes the camera 15 to sit level and parallel to the horizon.

In another embodiment the system 10 can make use of a camera mounted on a moving instrument for the control and manipulation of the output from any light source 16. The camera 15 can be gyroscopically controlled, maintaining itself and the image parallel to the horizon if required or moved remotely to randomly selected areas of interest or pre-programmed views and area of interest. Further the gyroscopically controlled camera mount maintains the area of interest in the field of view as it has onboard stabilisation.

In another embodiment of the system a drone controlled remotely by the system can fly to a designated area, maintaining its location for the operator to track a target. The drone can be fitted with a camera to relay a targets position geographically.

In a further embodiment a camera for day-time use and a camera for night time use can be co-axially mounted so that they have the same field of view and can be used with the same calibration.

It will be appreciated where a camera has fisheye aberrations, such as but not limited to barrel effect, pin cushioning or other optical anomalies, the system can provide Real-Time correction to eliminate aberrations in the video image.

The system 10 can be configured to use a projected mesh or other implementation to correct for lens aberrations in at least one camera and use projection to follow a target.

The system 10 can be configured to track the shadow of a target as it appears on a screen behind the target and increase or alter as required the output of that location in shadow so as not to detract from the look of the production. In other words shadow casting is eliminated. The system 10 can "Keyhole" the video on screen to allow for a binocular/keyhole effect for the operator to provide for keyhole emulation.

The system 10 can use existing lights or lights manufactured under this embodiment that cannot be seen in daylight hours, but which when fitted with a source visible to cameras, in daylight can be used to calibrate the system. The source 16A can provide a high frequency flashing of the media and this can be "seen" by a high frequency camera.

Figure 4:
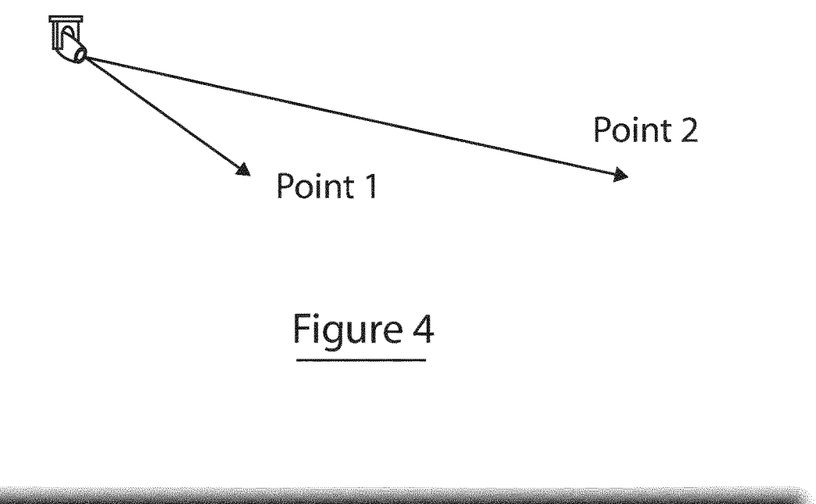
FIGS. 4, 5 and 6 illustrates how calibration and/or pre-calibration of a space can be carried out with one or more cameras.
Figure 5:
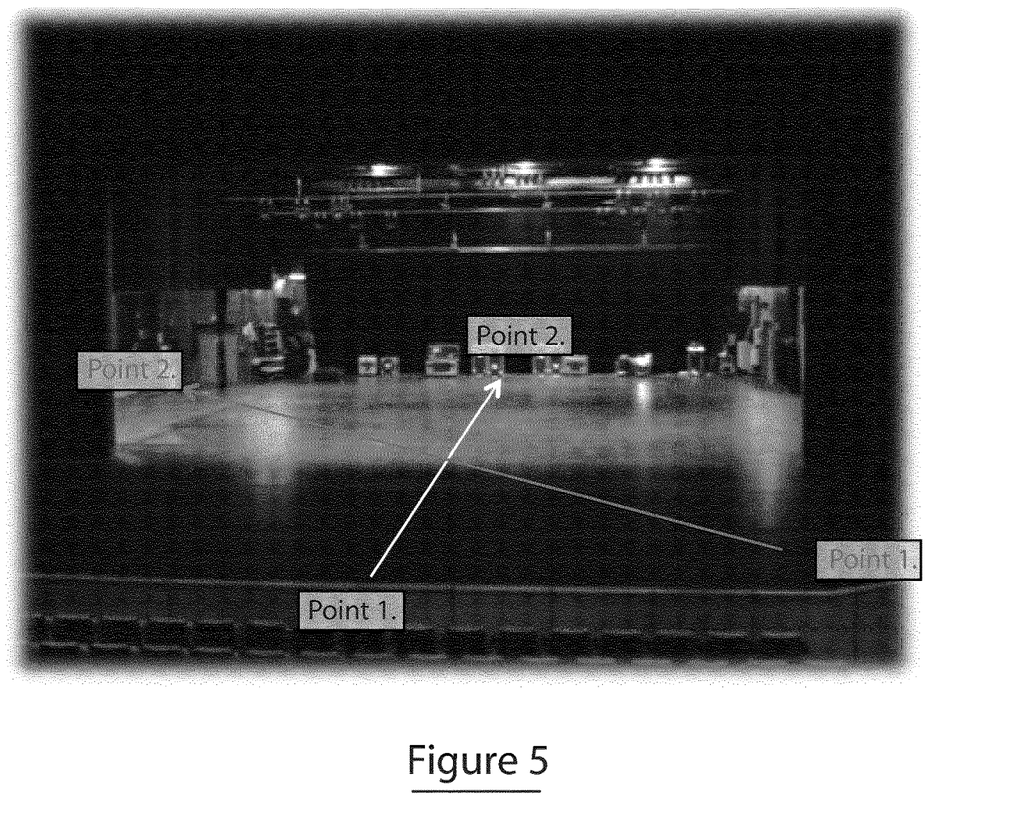
Figure 6:
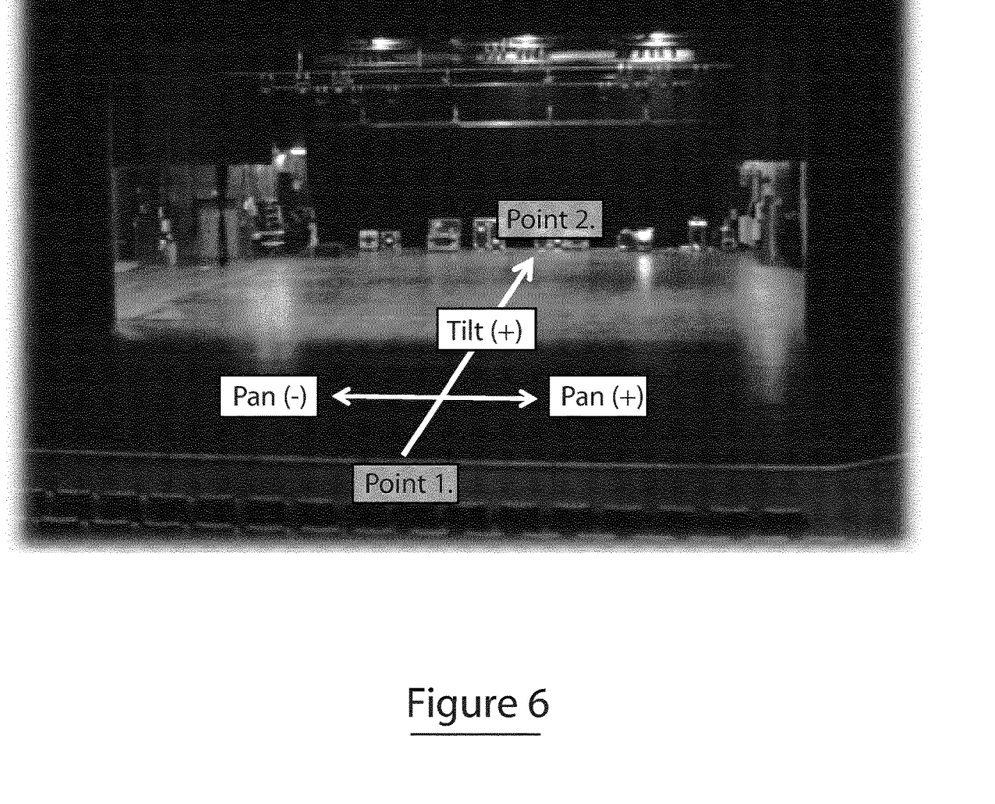

In a further embodiment known calibration methods can be implemented in this system to provide a pre-calibration to give an initial close to finished accuracy which enables a faster set-up. FIGS. 4, 5 and 6 illustrates how calibration and/or pre-calibration of a stage can be carried out where one or more cameras can be used to define an area which is calibrated for subsequent use.

The system 10 can incorporate current laser scanning technologies to measure specific targets in 3D space and there-by provide a real world "as built" level of accuracy when calibrating automated lights, projectors, lasers and other devices. By measuring specific locations on these elements and the location of their outputs it is possible to track multiple iterations or separately onto one target or multiple targets.

The position on the target 14 can automatically hold certain parameters of a source such as a lights' beam size, constant as the target moves closer and further away from the source. This can be applied to any controllable element of the source or output; as an example, but not limited to, a lights colour, beam focus, intensity, gobo, iris, zoom, shape. An audio systems volume, source, e.g. routing. A video sources content, beam size, intensity, a mechanical systems movement, acceleration, and other controllable elements. All this can be applied to any controllable input and any controllable output of sources and outputs.

The system 10 can provide an automatic prediction of a sources output co-ordinates on a screen, visualiser, or other mapping device that allows the user to mitigate manual alignment of sources to screen, visualisers and map targets. It will be appreciated that when the calibration is taking place the system can use either known positions of the light from visualisers or after the system calculates the first two to three positions the system can use proprietary algorithm to "predict" the next position of a source and to "learn" as it does the calibration to increase accuracy with each calibration point. In other words an algorithm can be used to provide learning to assist with calibration.

In a further embodiment the system can drive an autonomous vehicle directly in a manual mode. An example of this is where motorised 'trucks' are used to move people, objects, sets or other devices around a performance area, or a further example where in an industrial building it is possible to move any self propelled vehicle or manipulators in any direction when the system is calibrated and tracked. It will be appreciated that the system can use a mouse to drive position manually of motorised trucks, sets, or other devices. By using the on screen or geo fencing the system can inhibit their movement outside non safe areas or areas outside the performance space.

The system 10 can use a facial recognition module such that the facial and other defining characteristics of an element to be tracked and have the system track it. The system 10 is configured to track using facial recognition information and control the movement of at least one of a camera source, light source or projection element.

It will be appreciated that the system 10 is capable of communication over any of the communications methods used such as but not limited to ArtNet, SACN, RS485 DMX, PosiStageNetwork PSN, and others available, and other suitable communication protocols.

In a further embodiment the software can collect information from moving objects where lights and other instruments are attached. Taking the movement and positional information from a moving truss, moving piece of set, moving truck, moving projection or any apparatus where its positional information can be passed to the system, it is possible to track a target while the movement of the source is taking place.

The system 10 can be configured to attach one or more transducers, such as a Lidar or ultrasonic transducer, to a moving truss, object or other instrument and using these transducers send information on position to the system to provide Realtime tracking where a moving object was previously not fitted with such devices. These transducers may report their information wired or wirelessly but such transducers are not the currently available RF, IR positioning systems which report position based on IR cameras and RF triangulation of signals. Many theatres and venues feature trussing onto which lights are mounted for operation. These trusses are very often on winches, chain motors, or hemp lines. Where moving lights, projectors, and other sources are calibrated in each position then the system can mathematically track a target as the truss moves. Information on a trusses position, number of turns of a drum or other information can be sent to the system to provide position feedback.

From this the system maintains accuracy of tracking on a target. Where systems are manual it is possible to fit these machines, trusses, instruments with laser measurement, Lidar, ultra-sonic and other instruments to feedback the truss height.

It will be appreciated that where a light source is hung incorrectly it is not possible to track accurately with them in a measurement based system.

Measurement based systems are where the lights are visualised, calibrated through a camera, calibrated using marker systems from console manufacturers or where the lights follow where a moving camera points. To correct this, the system employs the use of an articulated joint, similar to a CV (constant Velocity) or Hardi-Spicer drive joint from which to mount the light or other instrument. When the light is in the lowered position, the light is pointed straight down, the centre of its beam marked on the stage or floor. The light is lifted into its final position, pointed straight down and the centre of its beam aligned over the marked point. The joints then lock using mechanical, or electromagnetic locks triggered by means of industry standard protocols such as DMX, Art-Net, SACn or others.

In a further embodiment it is possible to switch in or out of use any source while tracking automatically, manually or based on any input or output.

In a further embodiment it is possible to integrate the system 10 with safety systems or zones. An example is where a performer is being tracked on stage and a trap door opens. It is possible to set warning zones around the door to trigger alarms if a performer crosses them, warning operators than a performer is too close to danger.

The system 10 makes it possible to provide cueing to other systems in a closed loop and open loop environment. An example is where a performer leaves the stage, as they cross a line/point/or other indicator on the screen a signal (Audio/Video/Lighting or other) is sent to costumers that the performer has come off stage and needs a costume change.

The system 10 can be integrated with a lighting, video, audio, projection, media server instruments such as one or more consoles. The integration allows control of a tracking systems elements from inside a console. Integration can involve any input controllable element and any output-controlled element to be manually, automatically or otherwise controlled. This is further used where architectural lighting, audio, video, and other sources can be centrally controlled from a common device.

The system 10 is enabled to take "Snapshots" of inputs, outputs and all associated parameters and store them, use them or edit them as needed to create readymade system recall points or tracking 'palettes'.

The system 10 allows for messaging directly to operators based on times, events, inputs or outputs and a location of the tracked objects. These messages can be to an operator of the system. The messages can be provided in a file in English or a native language to the programmer and translated to a language where the system is used or toured. This means that language barriers between a lighting, sound, video, animation, movement or other designers are not an issue when travelling or setting up. An example of such messages is the appearance on the screen or other device such as a portable tablet, phone, or an audio message in the language of choice "The show is about to start, please test your devices".

The system 10 is adapted to integrate with a control surface for any user interface to assist with localisation to facilitate dark pickups. As an example, where the stage or area is dark, the console can drive a device such as a set piece, lighting spot, projection animation, etc to a geographical or on-screen location. In turn the operators control such as a mouse cursor will also drive to the spot. This provides the operator with a pick-up location of the object or person even though the stage may be dark.

It will be appreciated that where a user wants to avoid lighting a particular part of the stage while lights are performing a "ballyhoo" it is possible to denote the area where light is not to shine and then use the positional data from the screen cursor calibration to inform the lighting console when to lower the intensity of the light/audio/video or other elements when they enter the "dark zones".

The system 10 can manipulate instruments wholly, individually or parts of. An example of this is where all lighting instruments may need to have their axes rotated by 180 degrees.

The system 10 can recognise, consider or be manually controlled for the type of source it is moving and to alter its actions or buffer the controllers, users or systems actions accordingly. An example of this is where tungsten bulbs are used. When the lights intensity is dropped to zero for a blackout, the filament in the lamp will still glow for several seconds before going dark. In this case the system knowing the source is tungsten holds movement of the source until it is fully blacked out.

The system 10 can import data from known repositories of information, visualisers, drawing packages, simulators and media servers to populate its database with information relating to instruments for tracking, targeting or otherwise of interest.

The system 10 can control the parameters of different instruments by using the learned/calibrated values according to position and/or can be controlled manually but in addition the system can control threshold values of the systems predicted and controlled values. This means that the system allows for manual input but stays in an automatic mode to control as little or as much as is required.

The system 10 can be configured with a low threshold control to provide "all out diming" of instruments where several instruments are used together to illuminate, provide audio or another output at differing levels. When an instruction is sent to dim/cut/stop the source over a time interval, the brightest or largest levels are the last to finish where the system holds all levels until they reach a common low threshold.

Figure 7:
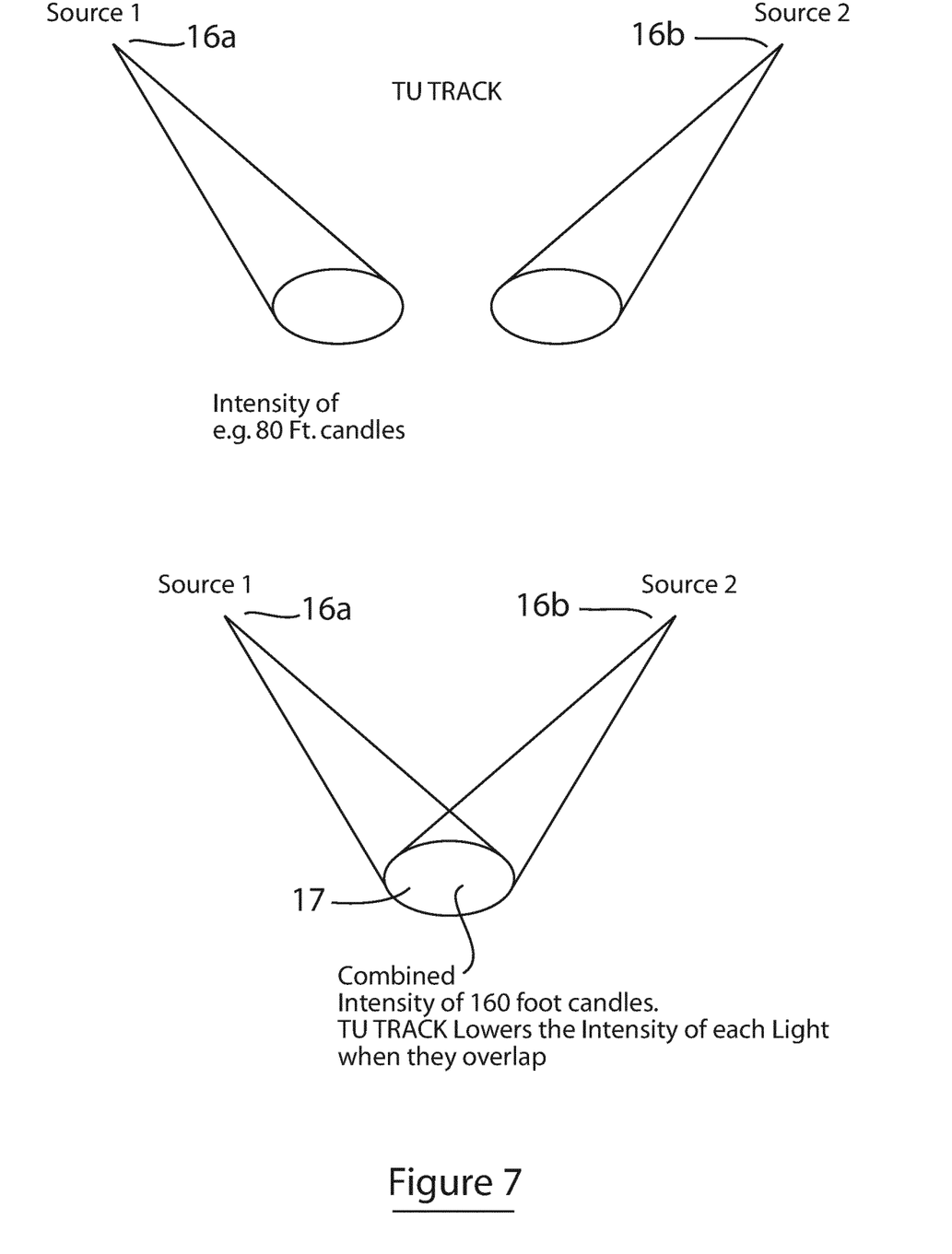
FIG. 7 illustrates a further embodiment of the system adapted to provide a multi source intensity tracking relative to a position.

FIG. 7 illustrates a further embodiment of the system 10 adapted to provide a multi-source intensity tracking relative to a position. This is where several light sources all track a target. When the lights sources change in output such as colour, quantity, direction or type, the overall intensity of light, can change. In this embodiment the system tracks the lighting instruments properties and status, in this instance two light sources are shown, 16a, 16b. The system calibrates the overall intensity of lighting on a target as seen by a camera. When a light is added to track the target the overall intensity changes, but the system can tell based on position and other attributes of the lights, how much to change the overall intensity, colouring or other properties of the sources to maintain a steady CRI, Colour temperature, Intensity, etc. showing control of intensity when lights sources spots overlap 17. This control of intensity is very important for TV cameras to operate successfully. In other words the system 10 can lower the intensity of each light source when they overlap with each other.

In a further embodiment where a camera sees an overall area, elements within that area such as a performer can be tracked using "Picture in Picture" type scenario. The idea is that a second image is generated from the first, smaller in size but following a target within the larger one.

Figure 8:
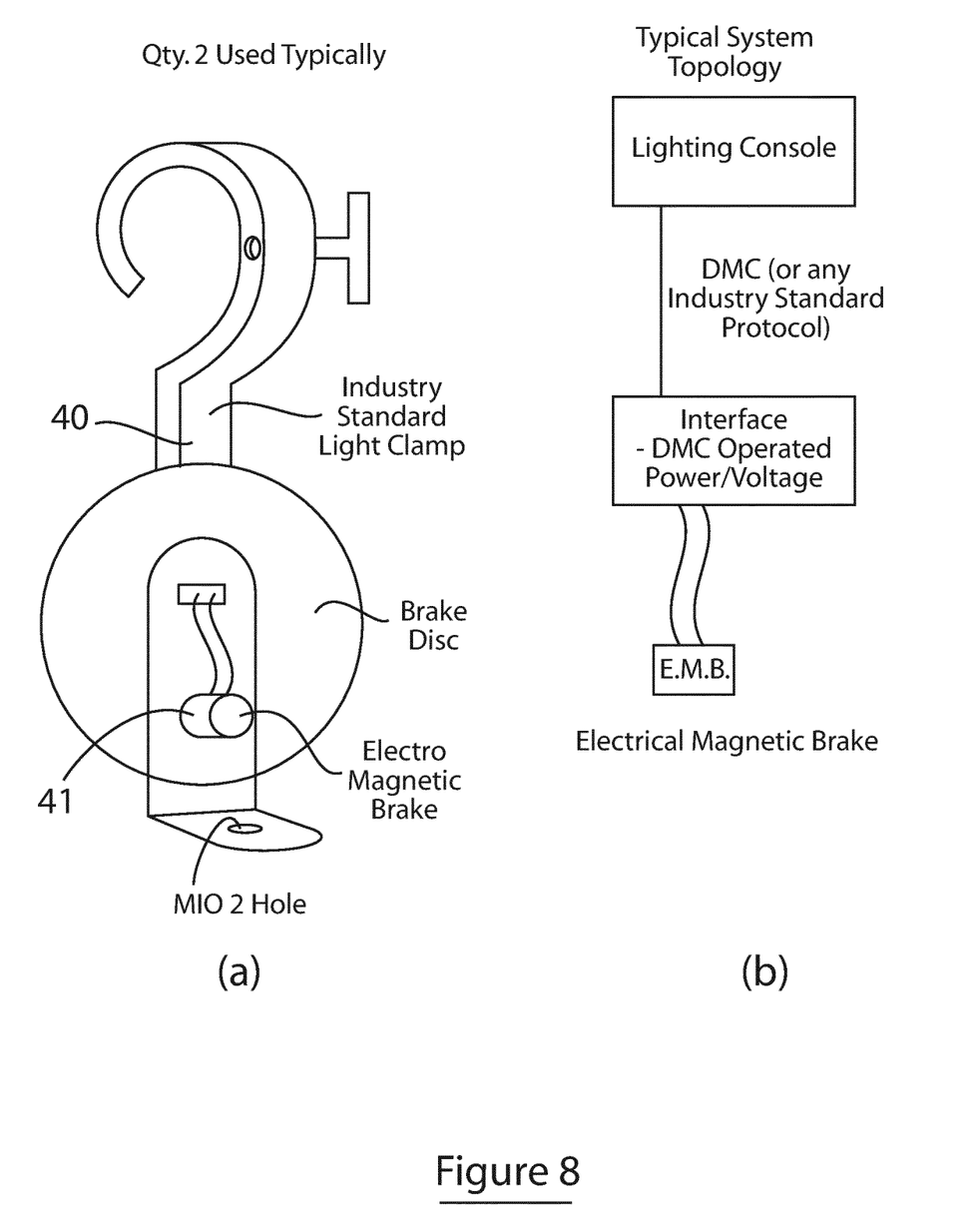
FIGS. 8a & 8b illustrates an electromagnetic levelling clamp for a moving light according to another embodiment.

FIGS. 8a and 8b illustrates an electromagnetic levelling clamp 40 for a moving light. The system 10 can control the operation and the positioning of light source or camera. The lighting clamp 40 can attach to a truss used in entertainment production systems. The light can hang freely and be adjusted to ensure its beam of light points straight down when the light is at its 0.0 position. When the centre/straight down position is attained, an electromagnetic brake/clamp 41 is engaged through the lighting console or other signal distribution system to ensure the light remains true.

The embodiments in the invention described with reference to the drawings comprise a computer apparatus and/or processes performed in a computer apparatus. The systems software element can be controlled via various embodiments of computing such as rack mounted, cloud based, PC based, IOS based or others. In addition the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A system comprising:
   light sources configured to track a target; and
   a computer apparatus configured to:
   locate the target with respect to a three-dimensional space;
   acquire at least one physical property of the target using a module configured to implement geo-fencing through at least one target-worn tag on the target, and enable auto image acquisition of the target;

control output changes to at least one media source and/or other source, including by changing outputs of the at least one media source and/or the other source based on the at least one acquired physical property of the target, or by changing inputs to the at least one media source and/or the other source based on the at least one acquired physical property of the target;

change intensity of at least one light source when light from two or more light sources intersect; and calibrate overall intensity of lighting on the target as seen by a camera, wherein the system further comprises a reflective element mounted on a coaxially aligned pan and tilt mechanism and configured to cooperate with the at least one light source, wherein the reflective element directs light to a desired location, and wherein the desired location is determined by a distance calculated between the at least one acquired physical property of the target to the reflective element.

2. The system of claim 1 wherein the at least one media source or the other source comprises at least one of: one of the light sources, one or more cameras, a screen or a drone.

3. The system of claim 1 wherein the at least one acquired physical property of the target comprises a calculated geographical location of the target within the three-dimensional space.

4. The system of claim 1 wherein the at least one media source or the other source is configured to move in a three-dimensional plane in response to a calculated physical property of the target.

5. The system of claim 1 wherein the computer apparatus is further configured to: control a position of the reflective element, wherein the reflective element directs light from one of the light sources to the desired location.

6. The system of claim 1 wherein the computer apparatus is further configured to: align at least one of video, audio, projection, tags, Global Positioning System (GPS) and line of sight, wherein the inputs to the at least one media source and/or the other source are calibrated to a real world position and provide an alignment between the target and the camera.

7. The system of claim 1 wherein the system is configured with a multipoint calibration scheme.

8. The system of claim 1, wherein the camera is configured to identify points within the three-dimensional space and provide positional data for the points within the three-dimensional space and the positional data aid the calibration or for ease of programming.

9. The system of claim 1 wherein positional data from a visualiser, drawing or computer aided design (CAD) program, the light sources have the positional data manipulated to provide an offset calibration to overcome differences in mechanical set-up for different locations.

10. The system of claim 1, wherein the at least one acquired physical property of the target is acquired using a geo-fencing technique.

11. The system of claim 1 wherein the target is a stage performer and the at least one light source is configured with Z offset height to focus pallets for performers of different heights.

12. The system of claim 1 comprising a screen wherein the camera is configured to feed an image of a performance area to the screen, wherein a software application enables an onscreen cursor denotes where one of the light sources is to illuminate.

13. The system of claim 1 wherein a screen comprises an on-screen notation identifying a plurality of sources and the sources properties.

14. The system of claim 1 wherein the system is further configured to send a trigger or information based on a position of the target when the target is moving.

15. The system of claim 1 wherein the camera has a weighted camera mount configured in a true horizontal and vertical alignment.

16. The system of claim 1 comprising a visible light source and non-visible light sources to aid calibration in sunlight or for In the blind calibration.

17. The system of claim 1 wherein the computer apparatus is further configured to use a shadow analysis module to accurately track follow spots in real time for one or more light sources.

18. The system of claim 1, wherein the computer apparatus is further configured to: calibrate movement of the at least one light source using a pre-calibration module to perform roughed in calibration prior to performing a more accurate calibration calculation.

19. The system of claim 1 wherein the target is a person, wherein the computer apparatus is further configured to:
track movement of the person based on facial features of the person, wherein the movement of the person is tracked using a facial recognition module.

20. The system of claim 1 wherein the computer apparatus is further configured to: track an element using facial recognition information; and control movement of the camera, one of the light sources or a projection element.

21. The system of claim 1 wherein the at least one light source comprises a clamp configured to allow free movement of the at least one light source.

22. The system of claim 1 wherein the at least one light source comprises a clamp configured to allow free movement of the at least one light source and wherein the clamp comprises a mechanically or magnetically actuated lock.

23. The system of claim 1, wherein the computer apparatus is further configured to:
automatically predict a position of a source output co-ordinates on a screen associated with the system.

24. The system of claim 1 wherein the at least one media source or the other source comprises a vehicle and a mouse device configured to control movement of the vehicle.

25. The system of claim 24 wherein the computer apparatus is further configured to:
inhibit movement of the vehicle outside non safe areas or areas outside a performance space.

26. A method comprising:
controlling output changes to at least one media source and/or other source including:
acquiring at least one physical property of a target using a module configured to implement geo-fencing through at least one target-worn tag on the target, and enable auto image acquisition of the target,
changing outputs of the at least one media source and/or the other source based on the at least one acquired physical property of the target, or
changing inputs to the at least one media source and/or the other source based on the at least one acquired physical property of the target;
changing intensity of at least one light source when light from two or more light sources intersect, wherein a plurality of light sources is configured to track the target; and calibrating overall intensity of lighting on the target as seen by a camera,
wherein a reflective element mounted on a coaxially aligned pan and tilt mechanism is configured to cooperate with the at least one light source, wherein the reflective element directs light to a desired location, and wherein the desired location is determined by a distance calculated between the at least one acquired physical property of the target to the reflective element.

27. The method of claim 26, further comprising:

locating the target within a three-dimensional space.

* * * * *